(12) United States Patent
Loncle

(10) Patent No.: US 9,835,113 B2
(45) Date of Patent: Dec. 5, 2017

(54) THRUST REVERSER FOR A TURBOJET ENGINE NACELLE COMPRISING AN END-OF-TRAVEL STOP ON THE PRIMARY GUIDE RAIL

(71) Applicant: AIRCELLE, Gonfreville l'Orcher (FR)

(72) Inventor: Alexis Loncle, Le Havre (FR)

(73) Assignee: AIRCELLE, Gontreville l'Orcher (FR)

( * ) Notice: Subject to any disclaimer, the term of this patent is extended or adjusted under 35 U.S.C. 154(b) by 0 days.

(21) Appl. No.: 15/076,907

(22) Filed: Mar. 22, 2016

(65) Prior Publication Data

US 2016/0281640 A1 Sep. 29, 2016

Related U.S. Application Data

(63) Continuation of application No. PCT/FR2014/052370, filed on Sep. 23, 2014.

(30) Foreign Application Priority Data

Sep. 23, 2013 (FR) ...................................... 13 59104

(51) Int. Cl.
| | |
|---|---|
| F02K 1/78 | (2006.01) |
| F02K 1/76 | (2006.01) |
| F02K 1/72 | (2006.01) |
| B64D 29/06 | (2006.01) |
| E05B 63/18 | (2006.01) |
| F02K 1/80 | (2006.01) |

(52) U.S. Cl.
CPC ............... *F02K 1/766* (2013.01); *F02K 1/72* (2013.01); *F02K 1/763* (2013.01); *B64D 29/06* (2013.01); *E05B 63/18* (2013.01); *E05B 63/185* (2013.01); *F02K 1/80* (2013.01); *Y02T 50/671* (2013.01)

(58) Field of Classification Search
CPC .... E05B 17/2038; E05B 63/18; E05B 63/185; B64D 29/06; F02K 1/70; F02K 1/72; F02K 1/766; F02K 1/80
USPC .................................................. 292/163, 175
See application file for complete search history.

(56) References Cited

U.S. PATENT DOCUMENTS

| | | | | |
|---|---|---|---|---|
| 1,355,735 | A | * | 10/1920 | Crompton ............... E05B 63/20 292/164 |
| 3,036,431 | A | | 5/1962 | Vdolek |
| 4,145,877 | A | | 3/1979 | Montgomery |
| 5,092,637 | A | * | 3/1992 | Miller ................. E05B 17/0037 292/150 |
| 6,584,763 | B2 | * | 7/2003 | Lymons .................... F02K 1/72 239/265.19 |

(Continued)

FOREIGN PATENT DOCUMENTS

| | | |
|---|---|---|
| EP | 1286037 | 2/2003 |
| EP | 1298309 | 4/2003 |

OTHER PUBLICATIONS

International Search Report dated Jan. 21, 2015 in International Application No. PCT/FR2014/052370.

*Primary Examiner* — Lorne Meade
(74) *Attorney, Agent, or Firm* — Burris Law, PLLC

(57) ABSTRACT

The present disclosure relates to a thrust reverser for a turbojet engine nacelle, including cowls that move backwards to open the thrust reverser. Each cowl includes a primary axial guide rail that receives most of the loads of the cowl, and secondary rails guiding an outer portion of each cowl. The thrust reverser includes a rear end stop for each cowl is arranged on the primary axial guide rails.

5 Claims, 3 Drawing Sheets

(56) References Cited

U.S. PATENT DOCUMENTS

| | | | | |
|---|---|---|---|---|
| 7,007,454 B2* | 3/2006 | Dehu | ............ | F02K 1/72 |
| | | | | 239/265.29 |
| 7,488,013 B2* | 2/2009 | Urpolahti | ............ | E04B 2/827 |
| | | | | 292/145 |
| 8,631,640 B2* | 1/2014 | Rouyer | ............ | B64D 29/00 |
| | | | | 239/265.27 |
| 2011/0259435 A1 | 10/2011 | Rouyer | | |

* cited by examiner

THRUST REVERSER FOR A TURBOJET ENGINE NACELLE COMPRISING AN END-OF-TRAVEL STOP ON THE PRIMARY GUIDE RAIL

CROSS-REFERENCE TO RELATED APPLICATIONS

This application is a continuation of International Application No. PCT/FR2014/052370, filed on Sep. 23, 2014, which claims the benefit of FR 13/59104, filed on Sep. 23, 2013. The disclosures of the above applications are incorporated herein by reference.

FIELD

The present disclosure concerns a thrust reverser for an aircraft nacelle accommodating a turbojet engine, as well as an aircraft nacelle equipped with such a thrust reverser.

BACKGROUND

The statements in this section merely provide background information related to the present disclosure and may not constitute prior art.

Motor assemblies for aircrafts generally including a nacelle forming a generally circular outer envelope, comprising inside a turbojet engine disposed along the longitudinal axis of this nacelle.

The turbojet engine receives fresh air coming from the upstream or front side, and rejects, from the downstream or back side, the hot gases issued from the combustion of fuel, which give a certain thrust. For bypass turbojet engines, fan blades disposed around this turbojet engine generate a significant secondary flow of cold air along an annular flow path passing between the engine and the nacelle, which adds a high thrust.

Nacelles may include a thrust reverser system which closes at least partially the annular flow path of cold air, and rejects the secondary flow forward in order to generate a braking thrust of the aircraft.

Some thrust reversers include downstream movable cowls which can slide axially backward under the effect of actuators, by deploying flaps in the annular flow path in order to close at least partially this flow path. The flaps return the cold air flow radially outward through gates that have been uncovered during this sliding, comprising blades which direct this flow forward.

In particular, the reverser may include a single cowl also called "O-duct," forming a shroud transversely forming a complete circle. Alternatively the thrust reverser may include two cowls symmetrically disposed relative to a vertical plane, each forming a semi-circle, also called "D-duct," thereby constituting a complete shroud.

The backward movement of the cowls is performed by control cylinders of the thrust reverser for the normal operation of the reverser, or to access to the internal portions of the nacelle in order to perform maintenance operations on the motor.

Each cowl includes an inner panel supported and axially guided by a primary rail longitudinally disposed in the nacelle, comprising a movable portion connected to the cowl, sliding on a fixed portion connected to the upstream structure. These primary rails have a high resistance to practically support the whole mass as well as the different stresses applied to the reverser during its operation.

The cowls also include secondary guide rails of the front portion of the outer panel of these cowls, which is cantilevered above the flow reversal gates, to inhibit bending of these portions.

Some "D-duct"-type half-cowls include two control cylinders fixed to an upper point and a lower point of each cowl, the two cowls not being connected to each other by an upper connection. In the event of absence or failure, during the flight, of the upper cylinder of a cowl that is open, the upper portion of this cowl is no longer sufficiently held to withstand the mass and the significant pressures exerted above. This cowl may be deformed or tilt with a backward movement of its upper portion, enough to dislocate the secondary rail.

The same issue may occur in the event of an absence or a failure of the lower cylinder, if the two cowls do not include a lower connection between the both of them. It can also be obtained with cowls maintained by three cylinders, if the assembly does not include a high rigidity.

In the same way, in the event of an absence or failure of the control cylinder, a single "O-duct"-type cowl may also be deformed or tilt enough to dislocate the secondary rail.

To address this disengagement issue of the secondary rail, it is known to place an end-of-travel stop on this rail in order to inhibit its dislocation in the event of a significant backward movement of the supported cowl.

Nonetheless, the secondary rails generally comprising a lightweight structure sufficient to a guiding of the outer portions of the cowls during the opening of the reverser, for its operation or for maintenance operations, are not intended to withstand high axial loads applied on an end-of-travel stop fixed on these rails, which may occur in the event of an absence or failure of a cylinder, during the operation of the thrust reverser.

SUMMARY

The present disclosure provides a thrust reverser for a turbojet engine nacelle, comprising cowls moving backward to open this thrust reverser, each cowl including a primary axial guide rail which mainly supports the load of this cowl, and a secondary rail guiding an outer portion of the cowl, remarkable in that a rear end-of-travel stop is disposed on the primary rail.

An advantage of this thrust reverser is that in the event of an absence or failure of a cylinder controlling the opening of a cowl, the primary rail provided to receive significant efforts being applied on this cowl during its operation, has a strength high enough to enable it without any modification to support the additional axial load being applied on this stop. Thus, a stop, which limits the backward movement of the cowl, is provided in a simple manner, without adding a significant mass, and allows avoiding a dislocation of the secondary rail guiding this cowl.

The thrust reverser according to the present disclosure may further include one or more of the following features, which may be combined with each other.

Advantageously, the end-of-travel stop includes a movable device allowing its deactivation, thereby allowing easy removal of the cowl for maintenance operations.

Advantageously, the end-of-travel stop includes a blocking device allowing it to be held in the deactivated position, thereby facilitating the removal operation of the cowl.

The blocking device may include a spring which holds the blocking device in a blocking position.

In particular, the movable device may include a sliding stop finger, comprising transverse grooves in which an axis forming the blocking device can be engaged. This system is simple to implement, and effective.

Advantageously, the thrust reverser includes a device compelling the operator to reset the movable device of the end-of-travel stop back in its activated position before closing up the nacelle assembly. This device provides safety by providing operation of the stop in-flight.

In particular, when the nacelle is completely closed up, in a position where the stop is deactivated, the stop finger can be positioned to generate an interference with an outer panel of this nacelle.

Advantageously the cowl being open, a small axial clearance interposed between the movable portion and the fixed portion of the end-of-travel stop, is calculated as a lower threshold value depending on the tolerances and the deformations of the different elements so that, during a normal operation, these portions do not come into contact. A significant shock on this stop is thereby inhibited.

The present disclosure also relates to a turbojet engine nacelle comprising a thrust reverser axially slidable under the effect of an actuator, remarkable in that this reverser includes any one of the preceding features.

Advantageously, subsequently to the absence or failure of a control cylinder of a cowl, this open cowl being bent, the movable stop being in phase advance relative to the normal movement of the cowl, the clearance is calculated for an actual opening of the cowl slightly lower than 100%. This clearance allows receiving the shock on the stop before a significant rise of the turbojet engine speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7A:
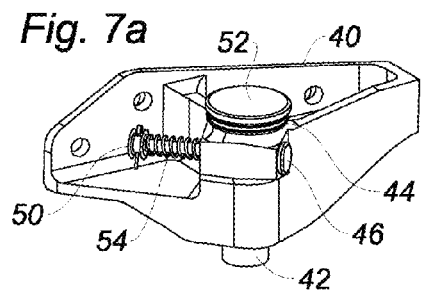
Figure 7B:
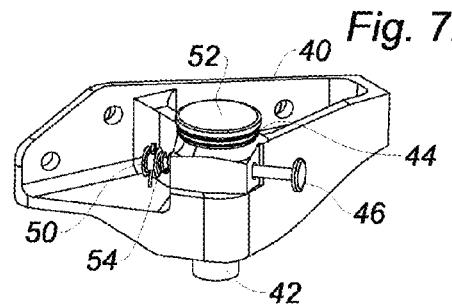
Figure 7C:
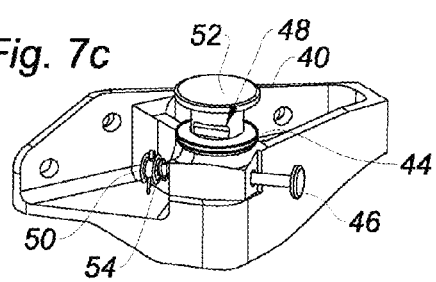
Figure 7D:
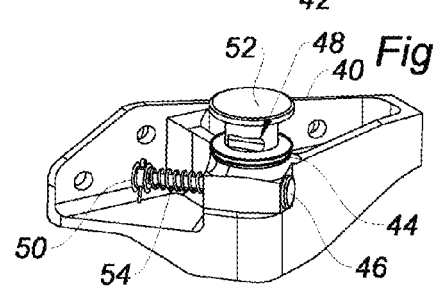
Figure 8A:
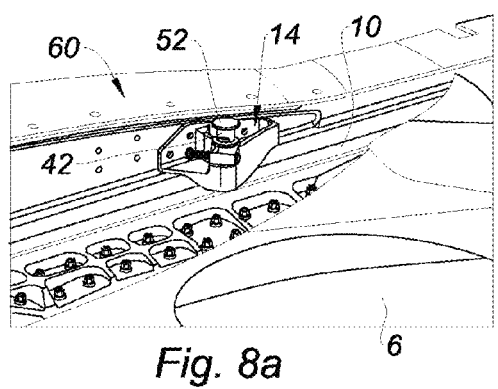
Figure 8B:
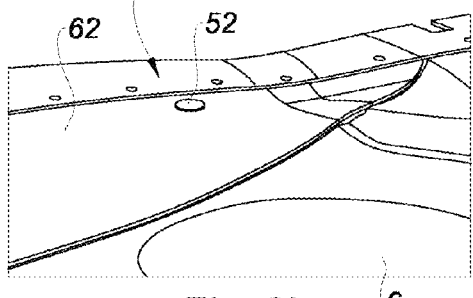

FIGS. 7a to 7d successively present four positions of the fixed stop during a complete removal operation of the cowl; and FIGS. 8a and 8b present a safety device of the fixed stop, implemented during this complete removal.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
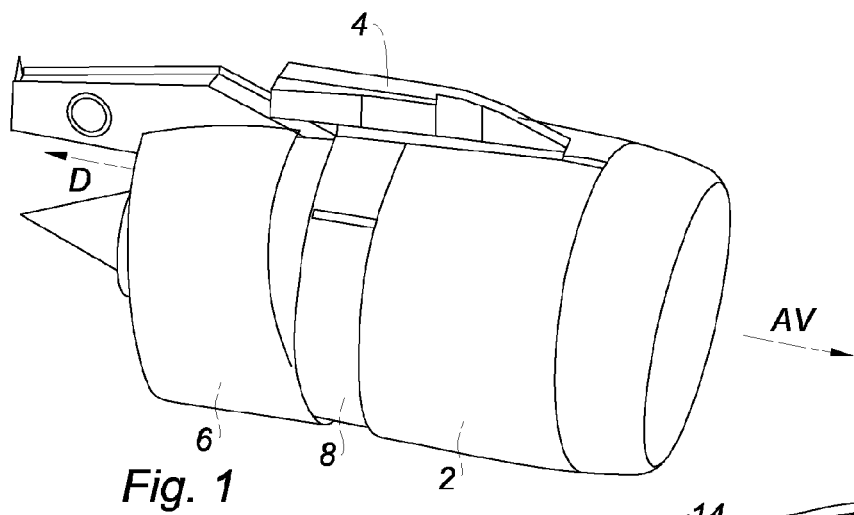
FIG. 1 is a distorted view of a nacelle including a thrust reverser comprising two cowls having no end-of-travel stops, subsequently to the absence or failure of an upper cylinder of a cowl.

FIG. 1 presents a nacelle including a fixed structure 2 held under the wing of an aircraft by a pylon 4, and a thrust reverser disposed to the rear of this nacelle, comprising two "D-duct"-type cowls 6 which are open to activate the thrust reverser, by uncovering flow reversal gates 8. The backward movement of each cowl 6 is controlled by an upper cylinder and a lower cylinder, these two cowls not being connected to each other by a direct connection in their upper portions.

The outer panel of the cowl 6 includes a non-visible secondary rail which supports and guides the front portion of this panel during the backward movement of the cowl.

In the event of an absence or failure of the upper cylinder with the open thrust reverser, a backward movement of the upper portion of the cowl 6 is obtained, as shown by the arrow "D", due to its mass, and to the different efforts that are applied above during the flight. In the absence of an end-of-travel stop of the cowl 6, the tilt-up of this cowl may be significant, and the secondary rail guiding it is dislocated.

Figure 2:
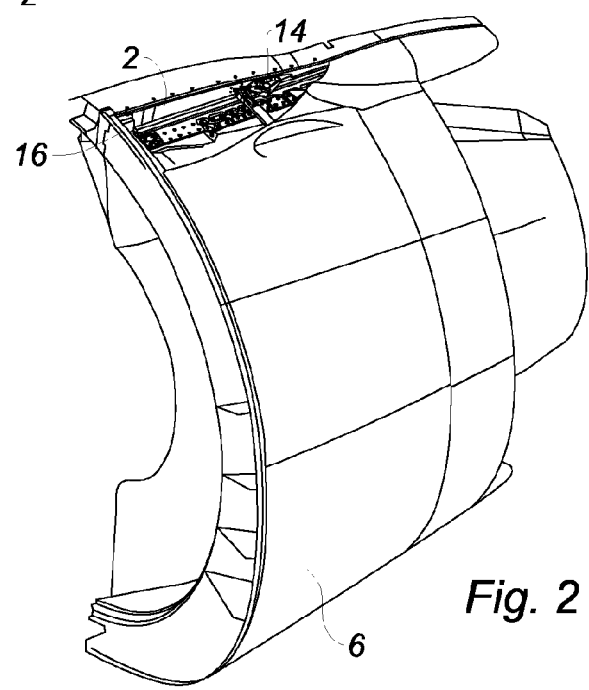
FIG. 2 is a view of a closed cowl for a thrust reverser according to the present disclosure.
Figure 3:
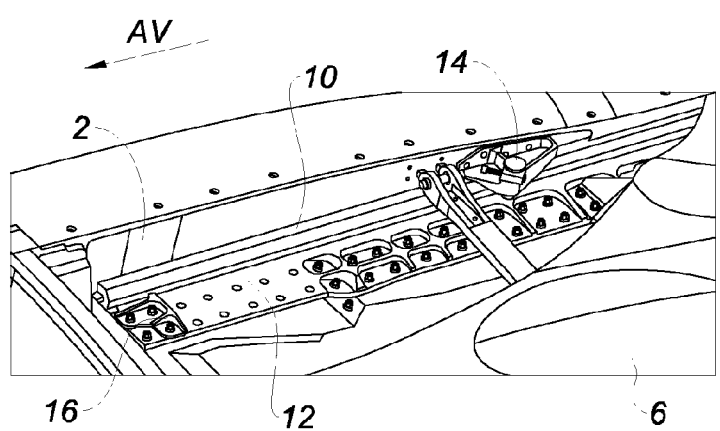
FIG. 3 is a detail view of the primary rail of this cowl.

FIGS. 2 and 3 present a primary longitudinal guide rail of the cowl 6, which supports it in its upper portion, comprising a fixed rail 10 which is connected to an upper fixed portion of the nacelle 2, and a movable rail 12 sliding in this fixed rail, which supports the cowl.

The fixed rail 10 includes a fixed stop 14, which forms a rear stoppage of a movable stop 16 disposed on the movable rail 12.

Figure 4A:
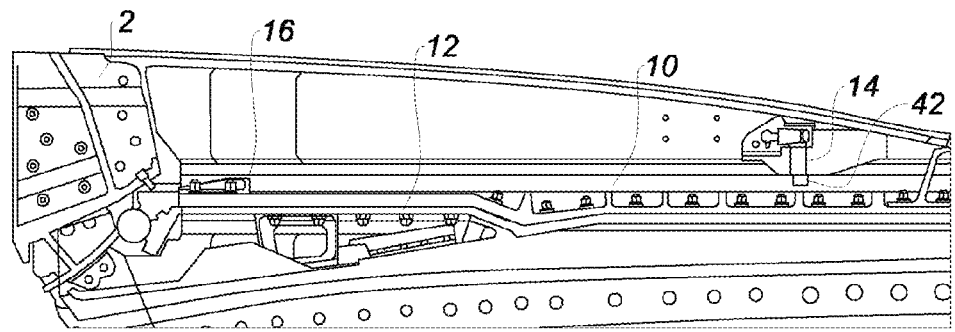
FIGS. 4a and 4b are side views of this primary rail, the cowl being respectively in a closed position and in an open position.

FIG. 4a presents the closed cowl, the movable stop 16 disposed at the front of the movable rail 12, includes a rear heel which is at the same height as the lower end of a vertical pin 42 of the fixed stop 14.

Figure 4B:
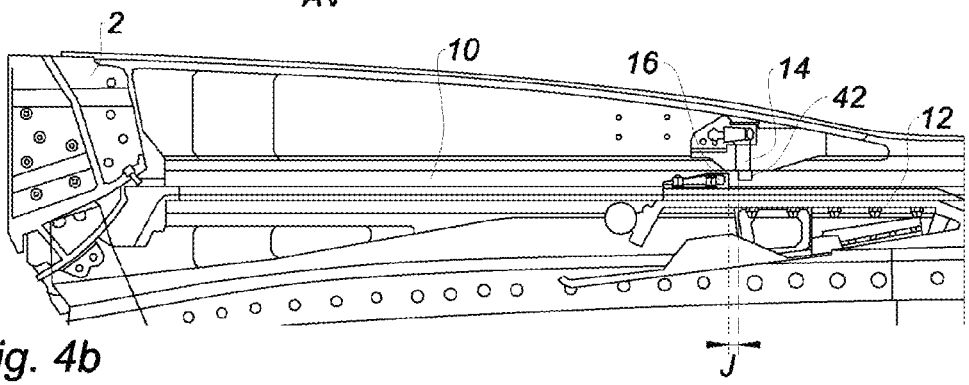

FIG. 4b presents the open cowl during the normal operation of the thrust reverser, the rear heel of the movable stop 16 coming just ahead the vertical pin 42 of the fixed stop 14, with a small axial clearance "J" interposed therebetween.

Figure 5A:
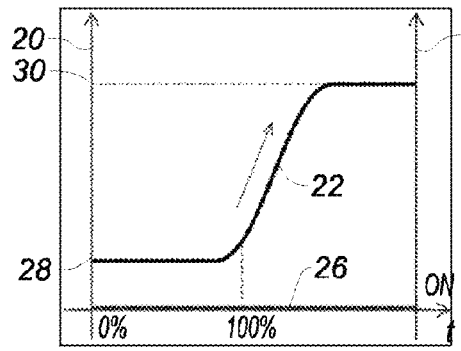
FIGS. 5a, 5b and 5c are schemes presenting, as a function of time, the rotational speed of the turbojet engine as well as the load on the end-of-travel stop, respectively for a normal opening of this thrust reverser, an opening subsequent to the absence or failure of an upper cylinder with a small axial clearance of the stop, and an opening with a large axial clearance.
Figure 5B:
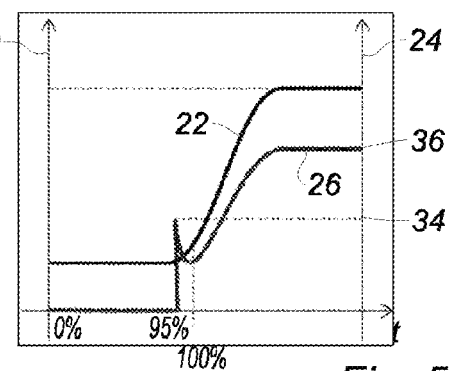
Figure 5C:
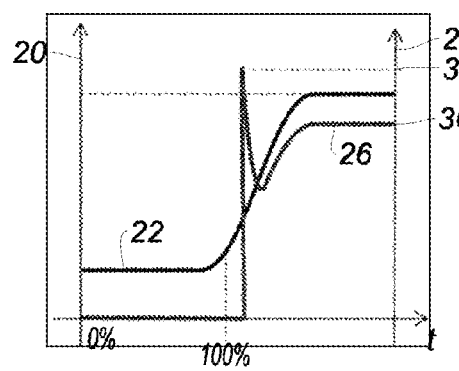

FIGS. 5a, 5b and 5c present, as a function of time t, a curve 22 of the rotational speed of the turbojet engine, this speed being measured on the left vertical axis 20, and a curve 26 of the load applied on the fixed end-of-travel stop 14, this load being measured on the right vertical axis 24. The flap is closed on departure with a 0% opening, and then opens gradually until reaching a complete 100% opening.

In the case of normal operation, presented in FIG. 5a, the cylinders move the cowls while the turbojet engine is at an idling speed 28, without exerting a significant thrust on the flaps of the thrust reverser so as to facilitate this operation. Shortly before the complete 100% opening, the turbojet engine is restarted to obtain at the earliest a high speed 30 giving a high power, to which corresponds a high axial load on the cowl, in order to quickly brake the aircraft.

The clearance J is calculated as a lower threshold value depending on the tolerances and the deformations of the different elements so that, during a normal operation, in all cases the movable stop 16 does not come into contact on the fixed stop 14. The control cylinders of the cowls 6 perform the end-of-travel of these cowls, the load on these stops 26 remains at zero.

In the event of a failure of an upper control cylinder, presented in FIG. 5b, the cowl 6 being bent backward, the movable stop 16 is in phase advance relative to the normal displacement of this cowl. The clearance J calculated as a lower threshold value, allows this movable stop 16 to bear on the fixed stop 14 for an actual opening of the cowl slightly lower than 100%, which is in this example 95%.

A peak load 34 on of the stop 26 is thereby obtained upon stopping the cowl 6, coming from its inertia, occurring before the increase of the speed of the turbojet engine 22, which is accompanied by high aerodynamic pressures on the thrust reverser. The load on the stop 26 is then increases depending on the force developed by the cylinders and the aerodynamic pressures, to stabilize until stabilizing at a load 36 higher than the peak value 34.

The peak 34 has not applied any overload on the end-of-travel stop. A protection of this end-of-travel stop is thereby achieved, which does not receive a force higher than the force that is generated by the turbojet engine 30 at its high speed.

In the event of an absence or failure of a cylinder with a too large clearance J, presented by FIG. 5c, the stoppage on this end-of-travel stop 14 occurs too late, after a complete theoretical 100% opening of the cowl 6, while the speed as well as the power of the turbojet engine power have substantially increased.

The end-of-travel stop 14 then receives a high peak load 38 exceeding the final load 36, coming from the inertia of the cowl 6 and the aerodynamic pressures given by the air flow delivered by the turbojet engine. A larger sizing of this stop is then desired.

Figure 6:
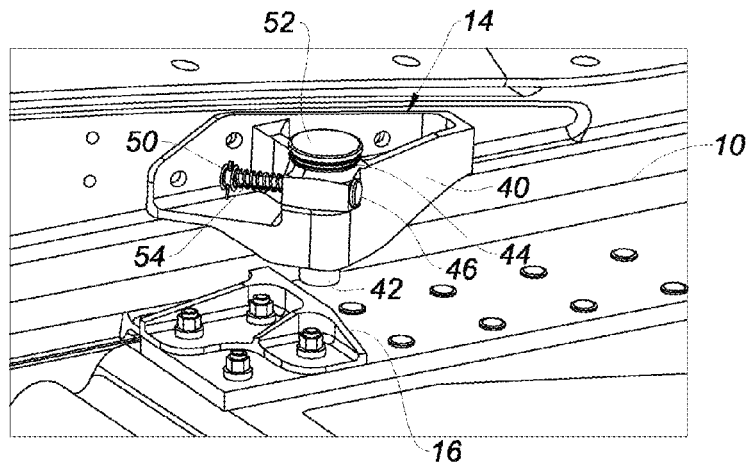
FIG. 6 is a detail view of the end-of-travel stop.

FIGS. 6 and 7 present the fixed stop 14 comprising a support 40 fixed on the fixed rail 10, which receives in a vertical bore the sliding stop finger 42, having an upper flange 52 forming a stop for this finger in the low position, as well as a gripping handle allowing an operator to lift the finger. A washer 44 is interposed between the upper flange 52 and the support 40.

In the low position, the stop finger 42 includes its lower end extending below the support 40, which is at the same height as the back heel of the movable stop 16 so as to stop it in its end-of-travel.

The support 40 has a tangential drilling receiving a sliding blocking horizontal axis 46, comprising in a rest position a portion located rearward having a larger diameter adjusted in the tangential drilling so as to form a guide, this portion being terminated at its rear end by a flange forming an end-of-travel stop which bears on the support.

The portion of the blocking axis 46 comprising the large diameter also forms a device for blocking the stop finger 42 in the low position, by coming into engagement in an upper transverse groove 48 performed on this finger.

The blocking axis 46 includes a front portion with a reduced diameter, which is terminated at its front end by a stop ring 50 fixed by a transverse pin. A coil spring 54 is engaged on this portion with reduced diameter in order to continuously exert a return force on this axis so as to stall it forward, its rear flange bearing against the support 40.

The operation of the fixed stop 14 is as follows. In a rest position presented in FIG. 7a, the blocking finger 42 is in its low position which is locked by the large diameter portion of the blocking axis 46, engaged in the upper groove 48 of this finger.

To remove the cowl from the nacelle by sliding it backward in order to disengage the sliding rail 12 from the fixed rail 10, for maintenance operations, the operator starts by pressing on the blocking axis 46 in order to move it backward, as presented in FIG. 7b, by compressing the compression spring 54.

Afterwards, the operator raises the stop finger 42 as presented in FIG. 7c, by maintaining the pressure on the blocking axes 46 in order to leave its reduced diameter portion opposite to this finger thereby allowing a free sliding of the finger in front of this axis.

For the final position presented in FIG. 7d, the operator has released the blocking axis 46 which is returned forward by its compression spring 54. The large diameter portion of the blocking axis 46 engages in a lower transverse groove of the stop finger 42 identical to the upper groove 48, in order to block this finger in an upper position allowing free passage of the movable stop 16 below its lower end.

Thus, the primary rail can be dislocated in order to remove the cowl. After resetting the cowl back, the reactivation of the stop is done reversely, by pressing again the blocking axis 46 rearward in order to allow the downward movement of the stop finger 42, and then releasing this axis in order to lock the finger in its lower position.

FIG. 8a presents the stop finger 42 in its upper position, comprising its upper flange 52 which is located at the outer surface 60 of an upper portion of the nacelle supporting the fixed rail 10.

In this position intended for removal of the cowl 6, the operator cannot replace an external cowl 62 presented in FIG. 8b, which is reset in position only after reset of the cowl, thus completing the external aerodynamic profile of the nacelle by fitting to the outer surface 60 for a continuous outer mold line as shown. This figure shows the interference between the upper flange 52 of the stop finger 42 and the panel 62.

Thus, a safety feature compelling the operator to put the fixed stop 14 back in its original position before closing the nacelle assembly is achieved, in order to provide the operation of the end-of-travel stop during the next flights.

The present disclosure provides simply and effectively an end-of-travel stop which can be easily mounted on a primary rail comprising high strength. Therefore, the secondary rail of the cowl, which is not designed to receive high axial loads, does not necessarily need to be changed.

The present disclosure applies to thrust reversers comprising a single "O-duct"-type cowl, or two "D-duct"-type cowls, these two cowls being independent, or comprising direct connections therebetween. It can also apply to various controls of cowls, regardless of the type of actuator and the number of cylinders, if it becomes desirable to perform a rear safety stop in the event of an absence or failure of a cylinder.

What is claimed is:

1. A thrust reverser for a turbojet engine nacelle comprising cowls moving backwards to open the thrust reverser, each cowl including a primary axial guide rail supporting loads of the cowl, and a rear end-of-travel stop for each cowl being disposed on each primary rail, wherein the rear end-of-travel stop comprises a sliding stop finger, and a blocking axis, wherein the sliding stop finger is movable between a deactivated position where the sliding stop finger generates an interference with an outer panel of a nacelle assembly of the turbojet engine nacelle, and an activated position where the sliding stop finger is moved away from the outer panel of the nacelle assembly to allow the nacelle assembly to be completely closed up so as to compel an operator to put the sliding stop finger back in the activated position before closing up the nacelle assembly of the turbojet engine nacelle, and wherein the blocking axis is disposed transverse to the sliding stop finger to lock the sliding stop finger in the activated position and the deactivated position.

2. The thrust reverser according to claim 1, wherein the blocking axis includes a spring which holds the blocking axis in a blocking position.

3. The thrust reverser according to claim 1, wherein the sliding stop finger comprises transverse grooves in which the blocking axis is configured to be engaged.

4. The thrust reverser according to claim 1, wherein an axial clearance is interposed between a movable portion and a fixed portion of the end-of-travel stop such that, during a normal operation, the movable portion and the fixed portion do not come into contact with each other.

5. A turbojet engine nacelle comprising a thrust reverser according to claim 1.

* * * * *